Nov. 12, 1946. G. B. BENANDER 2,411,017
OUTLET BOX AND GROUND STRAP PROVIDED WITH CABLE CLAMPS
Original Filed April 11, 1942
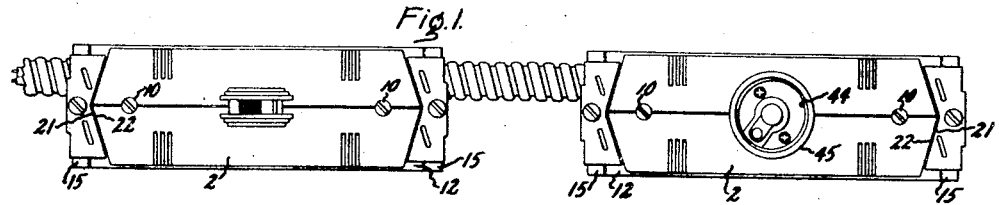
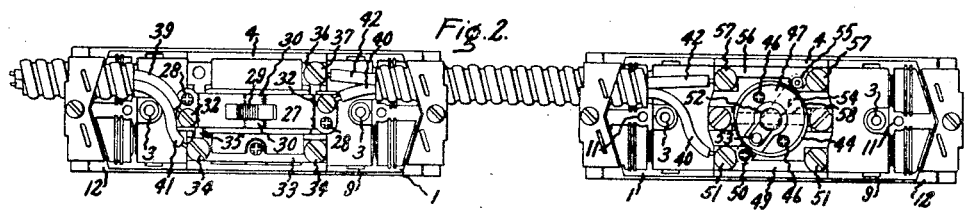
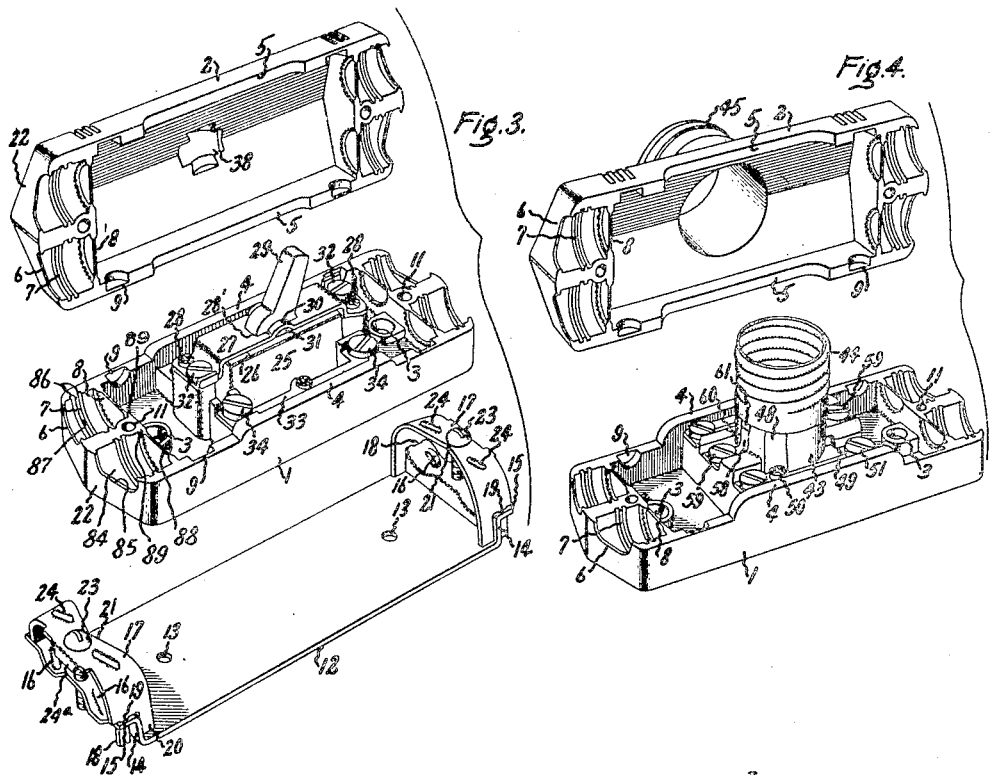
Inventor:
George B. Benander,
by Harry E. Dunham
His Attorney.

Patented Nov. 12, 1946

2,411,017

UNITED STATES PATENT OFFICE 2,411,017

OUTLET BOX AND GROUND STRAP PROVIDED WITH CABLE CLAMPS

George B. Benander, Oaklawn, R. I., assignor to Monowatt Electrical Corporation, a corporation of Connecticut Original application April 11, 1942, Serial No. 438,545. Divided and this application April 19, 1944, Serial No. 531,797

5 Claims. (Cl. 174—51)

1

This application is a division of my application Serial No. 438,545, filed April 11, 1942, issued as Patent No. 2,362,794, November 14, 1944.

The present invention relates to wiring devices of the type in which the device is part of the box for enclosing the connections to the power conductors. Such a wiring device is particularly adapted to surface wiring systems and may be termed a combined outlet and outlet box.

It is desirable that the devices be capable of use in wiring systems using metallic armored cable, non-metallic cable (cable having a non-metallic sheath or armor) and knob and tube open wiring. In the metallic armored cable system, a continuous ground connection must be carried through the metallic armor. In the present invention this is done by means of a ground strap used interchangeably with each of the devices and having clamps for holding the cable and making the ground connection to the metallic armor. In systems using non-metallic cable or open wiring, the ground strap is not necessary and its expense is eliminated.

The object of my invention is to provide an improved construction and arrangement in wiring devices of this type, particularly an improved grounding strap and for a consideration of what I believe to be novel and my invention, attention is directed to the following description and the claims appended thereto.

In the accompanying drawing, Fig. 1 is a top plan view of part of a surface wiring system using metallic armored power conductors and wiring devices embodying my invention; Fig. 2 is a view similar to Fig. 1 with the covers of the wiring devices removed; Fig. 3 is an exploded perspective view of the switch appearing in Fig. 1; and Fig. 4 is an exploded perspective view of the lamp socket appearing in Fig. 1.

Referring to the drawing, each of the wiring devices has an elongated base 1 and a cover 2 both of which may be made of suitable molded insulating material. The base is provided with screw holes 3 for attachment to a supporting surface and is narrow enough so that it can be attached to the narrow edge of two-by-four framing when used in an open wiring system. Along the sides of the base members are projections 4 which are of different sizes and which fit in corresponding depressions 5 in the sides of the respective covers. The projections and depressions 4 and 5 insure that the covers are assembled with and properly positioned on the bases for which they are designed. At each end of the device are two openings for armored power conductors. The openings are formed partly in the base and partly in the cover and are blocked by knockouts 6, 7, and 8 of different sizes, one or more of which are removed depending upon the size and type of power conductor to be connected to the device. Along the sides of the cover and base at each end are knockouts 9 for use in open wiring. The covers are attached to the respective bases by screws 10 threaded into sockets 11 in the base, and when assembled the base and cover serve as an outlet box for enclosing the device and its connections with the power conductors clamped between the cover and base.

When the wiring devices are used with metallic armored cable, the ground connection to the armor is made through a ground strap 12 having screw holes 13 in line with the screw holes 3 in the base so that the ground strap and base are secured to the support by the same screws. The base is seated on the ground strap with its ends confined between upwardly extending flanges 14 at the ends of the ground strap. At the top the flanges 14 are bent outwardly to provide horizontal flanges 15 which are suitably indented at 16 to provide the lower half of a clamp for gripping metallic armored cable. The upper half of the clamp is provided by a clamping member 17 having tongues 18 slidable in slots 19 in the flanges 15 and having tongues 20 extending along the inner faces of the flanges 14. The upper clamping member 17 at its top is provided with a tapered recess 21 of the same shape as the tapered projection 22 at the ends of the base and cover so the device may be assembled on the ground strap without disassembling the clamp. The tongues 20 which project inwardly beyond the extreme ends of the base and cover serve to locate the device on the ground strap. The clamping members are held together by screws 23 extending loosely through the center of the upper clamping member 17 and threaded into the center of the flange 15. The upper clamping member is indented at 24 and is provided with a flange 24a for more effectively gripping metallic cable. As shown more clearly in Fig. 2, the openings through the clamps are in line with the openings in the device.

In the single pole switch, as shown most clearly in Fig. 3, the base is provided with a hollow projection 25 housing the switch mechanism which need not be illustrated for the purposes of the present invention. Across the open top of the hollow projection 25 are a strip of insulating material 26 and a metal strap 27 fixed by screws 28 to the ends of the projection 25. The strap 27 is provided with a slot 28' through which the switch handle 29 of molded insulating material projects and is provided with arcuate seats 30 on each side of the slot 28' pivotally engaged by projections 31 integral with the switch handle. The switch handle accordingly is pivoted on the strap 27. At opposite ends the strap 27 is provided with terminal screws 32 so that the strap, which is insulated from the switch, may be used as a bus bar. At one side of the base is fixed a conductive strip or bus bar 33 having terminal screws 34 at opposite ends and at one end having an integral arm 35 (Fig. 2) connected to one of the switch contacts inside the projection 25. The other switch contact is connected to a strip 36 carrying a terminal screw 37 which is on the opposite side of the base from the terminals 34. The switch terminals 34 and 37 are accordingly on opposite sides of the base, and the mounting strap or bus bar 27 which is insulated from the switch terminals and is used to eliminate the need for a jumper extends lengthwise of the base at the center. The switch handle 29 projects out through a slot 38 in the cover.

When the switch is used to control a device at the end of a power line, as shown in Figs. 1 and 2, the ground conductors 39 and 40 are connected by the terminal screws 32 to opposite ends of the strap 27. The incoming live conductor 41 is connected to the terminal screw 34 at one end of the switch, and the outgoing live conductor 42 is connected to the terminal screw 37 at the opposite end. The circuit between the terminal screws 34 and 37 is respectively made and broken in the on and off positions of the switch.

In the lamp socket, as shown more clearly in Fig. 4, the base 1 is provided at the center with a cylindrical projection 43 on the upper end of which is mounted a screw shell 44, and the cover 2 is provided with a cylindrical projection 45 surrounding the upper end of the screw shell. The screw shell is fixed on the upper end of the projection 43 by screws 46 threaded into the projection through a flange 47 at the bottom of the screw shell. Integral with the screw shell is a metal strip 48 connected to a terminal strip 49 by means of a screw 50 threaded through the strips 48 and 49 into the base. The strip 49 at opposite ends is provided with terminal screws 51. Within the screw shell is a center contact 52 fixed to the upper end of the projection 43 by a rivet 53 which connects the center contact to one end of strip 54 on the under side of the projection 43. The other end of the strip 54 is connected by a rivet 55 to a terminal strip 56 provided at opposite ends with terminal screws 57. The socket terminal screws 51 and 57, like the switch terminal screws 34 and 37, are at opposite sides of the base. At the center of the base is a terminal strip or bus bar 58 provided at opposite ends with terminal screws 59 and extending up over the top of the projection 43 through a groove 60. The bus bar 58 extends beneath the screw shell 44 and center contact 52 and is insulated therefrom by a strip of insulating material 61 in the groove 60 on top of the bus bar 58. The bus bar 58 eliminates the need for jumpers in the same manner as the bus bar 27 in the previously described switch construction. In the wiring system shown in Figs. 1 and 2, the ground conductor 40 is connected to one of the terminal screws 51, and the live conductor 42 in series with the switch terminals 34 and 37 is connected to one of the terminal screws 57.

In each of the above described wiring devices the device and its enclosing box comprise a complete unit with the openings and clamps for power conductors. The terminals for the device are located on opposite sides of the enclosing box, and at the center is a bus bar insulated from the device which, as described above, may be used to feed a circuit through the device without the use of jumpers or other connections. The wiring is accordingly simplified since all of the wiring connections are made to terminal screws.

The use of the devices is further simplified by the conductor clamping arrangement having knockouts 6, 7, and 8 for use with #12 and #14 two and three conductor metallic and non-metallic armored cable and knockouts 9 for use with #12 and #14 open wiring. The knockouts 6, 7, and 8 are spaced apart along conductor receiving grooves 84 at each end of the base 1 and cover 2. The knockouts 6 are at the outer ends of the grooves and have surfaces 85 for gripping two conductor non-metallic cable in sizes #12 and #14. The knockouts 7 are arranged in channels 86 transverse to the length of the grooves 84 and have surfaces 87 projecting above the grooves 84 for gripping three conductor non-metallic and metallic armored cable in size #14 and two conductor metallic armored cable in sizes #12 and #14. The knockouts 7 may be removed by a screw driver or similar prying tool inserted into the space between the knockout and the sides of the channel 86. The knockouts 8 have thin removable sections 88 at the inner edges of ribs 89. The sections 88 form closures for the grooves 84 and when removed provide sufficient space for leading the conductors into the device as illustrated in Fig. 2. The grooves 84 are shaped to properly grip the largest cable (three conductor #12 non-metallic and metallic armored cable) for which the devices are designed. By removing one or more of the knockouts 6, 7, and 8, the device may be used with the customary sizes of armored cable. No adjustment of the conductor clamp is required other than the selective removal of the proper knockouts.

Because of the correlation of the wiring devices and the ground strap, the expense of wiring is decreased since the same wiring devices are interchangeably usable with non-metallic and metallic armored cable and the ground strap need be supplied only for metallic armored cable.

What I claim as new and desire to secure by Letters Patent of the United States is:

1. A metallic ground strap for use with a wiring device, said device comprising a housing of insulating material enclosing connector members, said housing comprising a base having a flat bottom adapted to rest on a supporting surface and a cover, and having cable admission openings and associated clamps for non-metallic armored cable, said ground strap comprising a flat strip of metal having upturned flanges integrally formed therewith at the ends of said strip, said flanges being spaced to receive between them said housing, said flanges having inwardly curved top surfaces on which the metallic armor of a metallic armored cable may lie, top clamp members having downwardly facing surfaces complementary to said first named surfaces, and screws for positioning the top clamp members with respect to said flanges, the spaces between said flanges and clamp members being so positioned that they are adapted to stand in line with the cable admission openings of said wiring device.

2. In a surface wiring device, a flat ground strap for attachment to a supporting surface, flanges on said strap, a combined outlet and outlet box of insulating material between said flanges, clamps for metallic armored cable cooperating with said flanges, said clamps having portions against which the end walls of the box fit to locate the box between the flanges, and cable admission openings in the box in line with said clamps.

3. A metallic ground strap for use with a wiring device, said device comprising a housing of insulating material enclosing connector members, said housing comprising a base having a flat bottom adapted to rest on a supporting surface and a cover, and having cable admission openings, said ground strap comprising a flat strip of metal having upwardly projecting flanges at its ends, said flanges being spaced to receive between them said housing, said flanges having upwardly facing top surfaces on which the metallic armor of a metallic armored cable may lie, top clamping members having downwardly facing clamping surfaces complementary to said first named surfaces, and means for positioning the top clamping members with respect to said flanges, the spaces between said flanges and clamping members being so positioned that they are adapted to stand in line with the cable admission openings of said wiring device.

4. The combination with a wiring device comprising a casing of insulating material having cable receiving openings in its end walls and a flat bottom wall, of a metallic ground strap comprising a flat plate having at its two ends adjustable cable clamps which position between them said casing with the clamps in line with said cable receiving openings, said flat plate fitting against the flat bottom wall of the casing whereby when the wiring device is mounted on a wall the flat plate lies between the bottom of the casing and such wall.

5. The combination with a wiring device comprising a casing of insulating material having cable receiving openings in its end walls and a flat bottom wall, of a metallic ground strap comprising a flat plate having at its two ends adjustable cable clamps which position between them said casing with the clamps in line with said cable receiving openings, said flat plate fitting against the flat bottom wall of the casing whereby when the wiring device is mounted on a wall the flat plate lies between the bottom of the casing and such wall, and means providing interengaging parts between the end walls of the casing and the cable clamps to hold the casing on the ground strap.

GEORGE B. BENANDER.